(12) United States Patent
Song

(10) Patent No.: US 10,732,921 B2
(45) Date of Patent: Aug. 4, 2020

(54) APPARATUS HAVING CURVED DISPLAY

(71) Applicant: Samsung Electronics Co., Ltd., Suwon-si, Gyeonggi-do (KR)

(72) Inventor: Sung-Hoon Song, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/436,685

(22) Filed: Jun. 10, 2019

(65) Prior Publication Data

US 2019/0294402 A1  Sep. 26, 2019

Related U.S. Application Data

(60) Division of application No. 15/670,818, filed on Aug. 7, 2017, now Pat. No. 10,359,985, which is a
(Continued)

(51) Int. Cl.
*H04M 1/00* (2006.01)
*G06F 3/14* (2006.01)
(Continued)

(52) U.S. Cl.
CPC ...... *G06F 3/1446* (2013.01); *G02F 1/133308* (2013.01); *G06F 1/1647* (2013.01);
(Continued)

(58) Field of Classification Search
CPC .... G06F 1/1628; G06F 3/1446; G06F 1/1647; G02B 5/122; G02B 5/045; G02B 5/136;
(Continued)

(56) References Cited

U.S. PATENT DOCUMENTS

| | | | |
|---|---|---|---|
| 5,555,157 A | 9/1996 | Moller et al. | |
| 6,654,071 B2 * | 11/2003 | Chen | G06F 3/044 345/104 |

(Continued)

FOREIGN PATENT DOCUMENTS

| | | |
|---|---|---|
| CN | 1809861 A | 7/2006 |
| CN | 1941968 A | 4/2017 |

(Continued)

OTHER PUBLICATIONS

Office Action dated Jan. 22, 2010 in connection with Chinese Patent Application No. 200810149182.3.
(Continued)

*Primary Examiner* — Mahendra R Patel

(57) ABSTRACT

An electronic paper display unit includes a protective case, which is made of a transparent material, a display, which is installed in the protective case, is powered to display desired image information, and includes a plurality of divided regions, and a control module, which is electrically connected with the display, and includes a first mode transmitting a divided mode signal such that many pieces of image information are independently displayed on the respective divided regions and a second mode transmitting an integrated mode signal such that one piece of image information is displayed throughout the overall divided regions. Further, a mobile communication terminal can visually display various pieces of image information thereon according to selection of a user.

19 Claims, 6 Drawing Sheets

Related U.S. Application Data continuation of application No. 14/665,981, filed on Mar. 23, 2015, now Pat. No. 9,727,299, which is a continuation of application No. 12/284,047, filed on Sep. 18, 2008, now Pat. No. 8,996,068.

(51) Int. Cl.
| | | |
|---|---|---|
| *G02F 1/1333* | (2006.01) | |
| *H04M 1/02* | (2006.01) | |
| *G06F 1/16* | (2006.01) | |
| *H04B 1/3888* | (2015.01) | |
| *G09G 3/36* | (2006.01) | |

(52) U.S. Cl.
CPC ........ *H04B 1/3888* (2013.01); *H04M 1/0254* (2013.01); *H04M 1/0266* (2013.01); *H04M 1/0283* (2013.01); *G09G 3/3611* (2013.01); *G09G 2300/026* (2013.01)

(58) Field of Classification Search
CPC ............ G02F 1/133308; G09G 3/3611; G09G 2300/026; G08G 1/017; G09F 13/16; B60Q 1/56; B60R 13/10; G03B 21/56; H04M 1/0266; H04M 1/0283; H04M 1/0254; H04B 1/3888
USPC .......................... 455/575.8; 359/529; 206/320
See application file for complete search history.

(56) References Cited

U.S. PATENT DOCUMENTS

| | | | |
|---|---|---|---|
| 6,927,908 | B2 | 8/2005 | Stark |
| 7,030,860 | B1 | 4/2006 | Hsu et al. |
| 7,499,074 | B2 | 3/2009 | Kim et al. |
| 7,620,425 | B2 | 11/2009 | Ju |
| 7,868,778 | B2 * | 1/2011 | Kenwright ............. G06F 3/044 340/686.6 |
| 7,933,123 | B2 | 4/2011 | Wang et al. |
| 8,032,177 | B2 | 10/2011 | Kim et al. |
| 8,115,798 | B2 | 2/2012 | Kim et al. |
| 8,174,628 | B2 * | 5/2012 | Matsushita ....... G02F 1/133305 348/836 |
| 8,996,068 | B2 | 3/2015 | Song |
| 9,437,071 | B2 | 9/2016 | Wells et al. |
| 9,727,299 | B2 | 8/2017 | Song |
| 9,819,382 | B2 * | 11/2017 | Fathollahi ........... H04M 1/0202 |
| 9,916,078 | B2 | 3/2018 | Kim et al. |
| 2002/0158998 | A1 * | 10/2002 | Hashimoto ......... G02F 1/13452 349/58 |
| 2002/0196400 | A1 | 12/2002 | Hashimoto et al. |
| 2003/0193625 | A1 | 10/2003 | Yoshida et al. |
| 2004/0169044 | A1 * | 9/2004 | Chen ................... H04M 1/0216 220/836 |
| 2004/0262179 | A1 * | 12/2004 | Gartrell ................. A45C 11/00 206/320 |
| 2005/0037843 | A1 * | 2/2005 | Wells ................ G07F 17/3211 463/30 |
| 2005/0068291 | A1 * | 3/2005 | Coley ..................... G09G 5/10 345/156 |
| 2005/0073829 | A1 | 4/2005 | Burger et al. |
| 2005/0140778 | A1 | 6/2005 | Kim et al. |
| 2005/0264472 | A1 * | 12/2005 | Rast .......................... G09G 3/14 345/30 |
| 2006/0044651 | A1 * | 3/2006 | Mimura ................. G02B 5/045 359/529 |
| 2006/0046780 | A1 | 3/2006 | Subramaniam et al. |
| 2006/0077544 | A1 * | 4/2006 | Stark ................... G02F 1/13336 359/448 |
| 2006/0119615 | A1 | 6/2006 | Zhou et al. |
| 2006/0121963 | A1 * | 6/2006 | Gartrell ................. A45C 11/00 455/575.8 |
| 2006/0165919 | A1 * | 7/2006 | Suzuki ................. C08F 214/18 428/1.31 |
| 2006/0171044 | A1 * | 8/2006 | Carnevali ........... G02B 25/005 359/802 |
| 2006/0238494 | A1 | 10/2006 | Narayanaswami et al. |
| 2007/0054443 | A1 * | 3/2007 | Shimomura ......... B23K 26/067 438/149 |
| 2007/0093281 | A1 | 4/2007 | Park et al. |
| 2007/0146569 | A1 | 6/2007 | Nouchi et al. |
| 2007/0146616 | A1 | 6/2007 | Nouchi et al. |
| 2007/0202917 | A1 | 8/2007 | Phelps et al. |
| 2007/0291473 | A1 * | 12/2007 | Traynor .................. B60Q 1/56 362/106 |
| 2008/0030427 | A1 * | 2/2008 | Lanham .................. G09F 21/06 345/2.3 |
| 2008/0042997 | A1 | 2/2008 | Endo |
| 2008/0062139 | A1 | 3/2008 | Hotelling et al. |
| 2008/0297878 | A1 | 12/2008 | Brown et al. |
| 2008/0310185 | A1 * | 12/2008 | Oliver .................... G02B 6/006 362/602 |
| 2009/0082067 | A1 | 3/2009 | Song |
| 2015/0193189 | A1 | 7/2015 | Song |

FOREIGN PATENT DOCUMENTS

| | | |
|---|---|---|
| EP | 1079584 A2 | 2/2001 |
| EP | 1659765 A1 | 5/2006 |
| EP | 1686446 A1 | 8/2006 |
| JP | 2004524551 A | 8/2004 |
| KR | 10-0377003 B1 | 3/2003 |
| KR | 10-2003-0074628 A | 9/2003 |
| KR | 10-2005-0066593 A | 6/2005 |
| KR | 10-2007-0043287 A | 4/2007 |
| KR | 20070101946 A * | 10/2007 |
| KR | 20080055084 A * | 6/2008 |
| WO | 0242838 A1 | 5/2002 |
| WO | 2004070331 A1 | 8/2004 |
| WO | 2004111986 A2 | 12/2004 |
| WO | WO-2015098976 A1 * | 7/2015 ............ F21V 33/00 |

OTHER PUBLICATIONS

Office Action dated May 31, 2011 in connection with Chinese Patent Application No. 200810149182.3.

European Search Report dated Oct. 12, 2011 in connection with European Patent Application No. 08163872.8.

Korean Notice of Decision to Grant dated Feb. 13, 2014 in connection with Korean Patent Application No. 10-2007-0096507.

* cited by examiner

APPARATUS HAVING CURVED DISPLAY

CROSS-REFERENCE TO RELATED APPLICATIONS

This application is a divisional of application Ser. No. 15/670,818, filed Aug. 7, 2017, which is a continuation of application Ser. No. 14/665,981, filed Mar. 23, 2015, now U.S. Pat. No. 9,727,299, which is a continuation of application Ser. No. 12/284,047, filed Sep. 18, 2008, now U.S. Pat. No. 8,996,068, which claims priority to Korean Application No. 10-2007-0096507, filed Sep. 21, 2007, the contents of which are all incorporated by reference herein.

BACKGROUND

1. Field

The present invention relates to an electronic paper display unit and a mobile communication terminal having the same and, more particularly, to an electronic paper display unit, which visually displays various pieces of image information on the outer faces of a mobile communication terminal, and a mobile communication terminal having the same.

2. Description of Related Art

In general, with the increasing mobile communication users and the technological development of the mobile communication terminals, the mobile communication terminals have been added with a variety of multimedia functions, for instance, camera, moving picture display, game, etc., in addition to the simple communication function.

Further, as the multimedia functions are added, the display device of the mobile communication terminal has been developed from a light emitting diode (LED) to a liquid crystal display (LCD), and then equipped with a color LCD from a monochrome LCD.

In addition, as the size of an LCD screen becomes larger, the secondary LCD screen can be operated without using the primary LCD screen to save the battery power and protect the LCD screen life in the normal situations.

This LCD screen is designed to display desired image information on the remaining outside portion other than a molding that forms a body of the mobile communication terminal.

In other words, the LCD screen is designed to help the users easily recognize and select the information while communicating with each other or while receiving or sending information from or to a given network host.

Thus, the body of the mobile communication terminal is normally assembled with the already colored or coated parts except the LCD screen. Therefore, it is difficult to express every user's personal interests and characteristics on the assembled body parts.

For this problem, the users normally attach a separate cover or a pouch to the body of the mobile communication terminal.

Thus, the users can partly express their disposition and personality using the differently designed materials with various colors. However, since the cover is separately attached on the terminal body, foreign matters such as dusts are easily deposited between the cover and the body.

As such, today there is a demand for the development of variously displaying the image information, for instance, moving pictures, photographs, etc., somewhere on their mobile communication terminals. Thus, every user can express personal interests and personalities on the other areas rather than the LCD screen.

SUMMARY

To address the above-discussed deficiencies of the prior art, it is a primary object to provide an electronic paper display unit, which is installed in a protective case made from a transparent material, and independently displays many pieces of desired image information such as moving pictures, photographs or the like in the divided regions, or displays one piece of desired image information throughout the overall divided regions, and a mobile communication terminal having the same.

The present invention also provides an electronic paper display unit, which displays various pieces of image information on the outer faces of the main body as well as the sub-body of a mobile communication terminal, and thus the present invention increases the beauty of the outer faces, and a mobile communication terminal having the same.

The present invention also provides an electronic paper display unit, which easily corrects a contrast at the edge or circumference of the rounded body of a mobile communication terminal, and thus increases the beauty of the outer faces, and a mobile communication terminal having the same.

According to an aspect of the invention, there is provided an electronic paper display unit, which includes: a protective case, which is made from a transparent material; a display, which is installed inside the protective case and powered to display desired image information on a plurality of divided regions; a control module, which is electrically connected with the display and includes a first mode transmitting a divided mode signal so that two or more pieces of image information are independently displayed on the divided regions, and a second mode transmitting an integrated mode signal so that one piece of image information is displayed throughout the divided regions.

Here, the protective case may further include the base member on one side thereof.

Further, the protective case may be made from a transparent plastic material or a transparent elastic material.

Meanwhile, one or more of the divided regions may be formed as the curved regions.

Among the divided regions, the outermost ones may further include the sub-regions that are curved on the outer circumferences of the divided regions, and each curved sub-region may be powered to display the image information which is gradually increased from a first end to a second end of the curved sub-region.

Further, each sub-region may include a plurality of the divided sub-regions.

According to another aspect of the invention, there is provided a mobile communication terminal having an electronic paper display unit, which includes: a main body, on which both a first circuit board and a liquid crystal display electrically connected with the first circuit board are installed; a sub-body, which is coupled with the main body, on which a second circuit board electrically connected with the first circuit board is installed, and on which a battery supplying power to the first and second circuit boards is mounted; a protective case, which is installed on the outside of the main body and the sub-body and has a predetermined thickness, and which is made of a transparent material; a display, which is installed inside the protective case and is powered from the outside to display a desired image information, and which includes a plurality of divided regions; and a control module, which is installed in the sub-body to connect electrically with the display, and which includes both a first mode, transmitting a divided mode signal such that a plurality of pieces of image information are independently displayed on the divided regions, and a second mode, transmitting an integrated mode signal such that one piece of image information is displayed throughout the divided regions.

Here, the protective case may be coupled to the outside of either the main body or the sub-body using a coupling means. The coupling means may include sliding ridges, which are formed on opposite sides of the main body and the sub-body, and sliding holes, which are formed on opposite sides of the protective case and are coupled with the sliding ridges.

Further, the protective case may be made of a transparent plastic material or a transparent elastic material.

Also, one or more of the divided regions may be formed as the curved regions.

Among the divided regions, the outermost ones may further include sub-regions that are curved on the outer circumferences of the divided regions, and each curved sub-region may be powered to display the image information, a contrast of which is gradually increased from a first end to a second end of the curved sub-region.

Further, each sub-region may include a plurality of divided sub-regions.

According to the present invention, the electronic paper display unit can be installed in the protective case made from a transparent material, and independently displays many pieces of desired image information such as moving pictures, photographs or the like on the divided regions, or displays one piece of desired image information throughout the divided regions.

The electronic paper display unit can display various pieces of image information on the outer faces of the main body as well as the sub-body of the mobile communication terminal, and thus the present invention increases the beauty of the outer faces.

The electronic paper display unit can easily correct the contrast at the edge or circumference of the rounded body of the mobile communication terminal, and thus increase the beauty of the outer faces.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication terminal.

An electronic paper display unit and a mobile communication terminal having the same, according to the present invention, will be described below with reference to the accompanying drawings.

Here, the configuration of the electronic paper display unit is substantially included in the configuration of the mobile communication terminal.

Thus, the configuration of the electronic paper display unit will be described together with the configuration of the mobile communication terminal.

Figure 1:
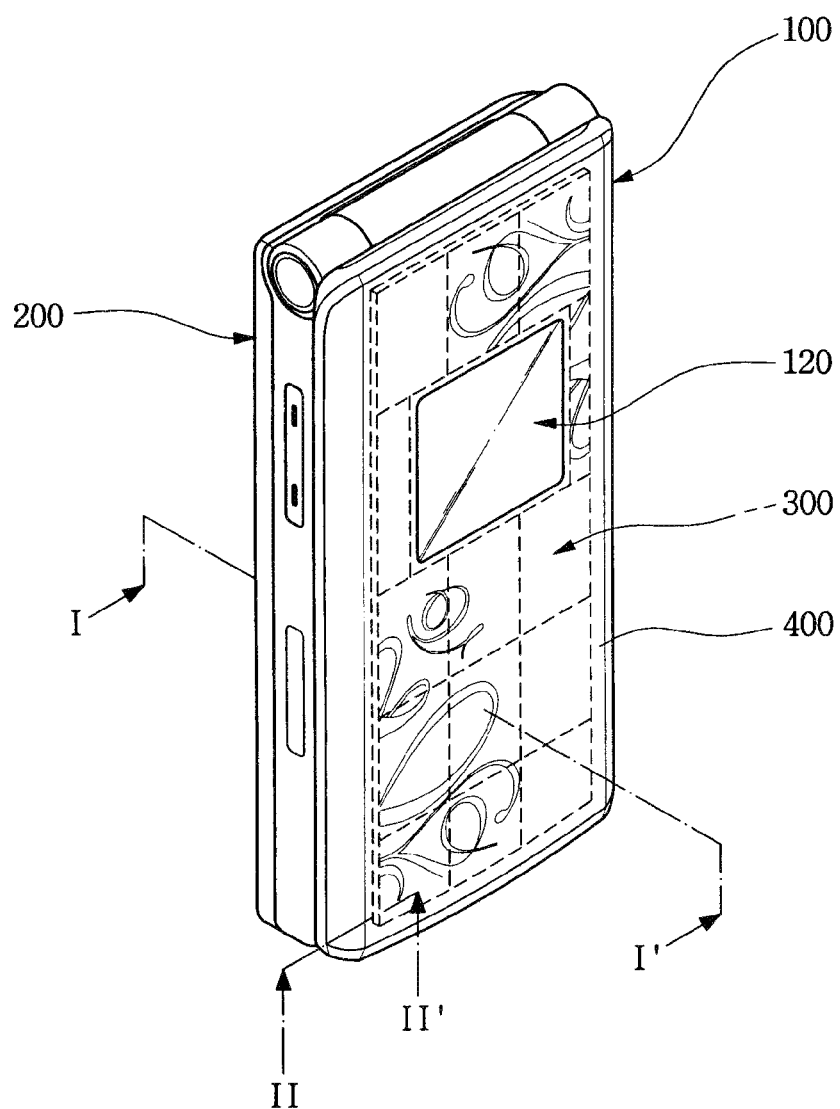
FIG. 1 is a perspective view illustrating a mobile communication terminal having an electronic paper display unit according to a first embodiment of the present invention.
Figure 4:
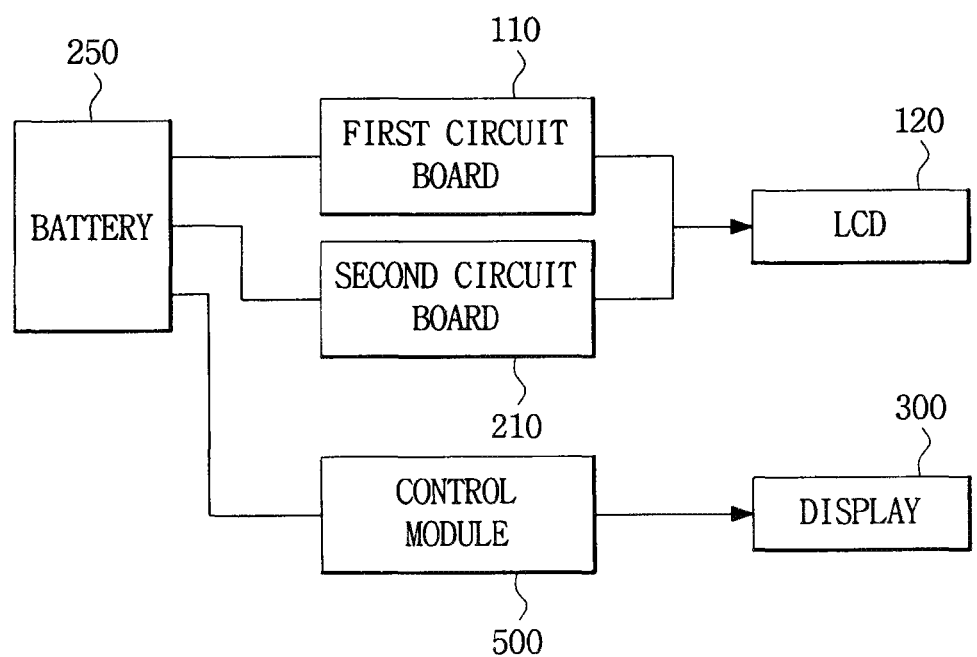
FIG. 4 is a block diagram illustrating a configuration of a mobile communication terminal according to an embodiment of the present invention.

Referring to FIGS. 1 and 4, the mobile communication terminal having an electronic paper display unit includes: a main body 100, on which both the first circuit board 110 and a liquid crystal display (LCD) 120 electrically connected with a first circuit board 110 are installed; a sub-body 200, which is coupled with the main body 100, on which a second circuit board 210 electrically connected with the first circuit board 110 is installed, and on which a battery 250 supplying the power to the first circuit board 110 and the second circuit board 210 is mounted.

Figure 2:
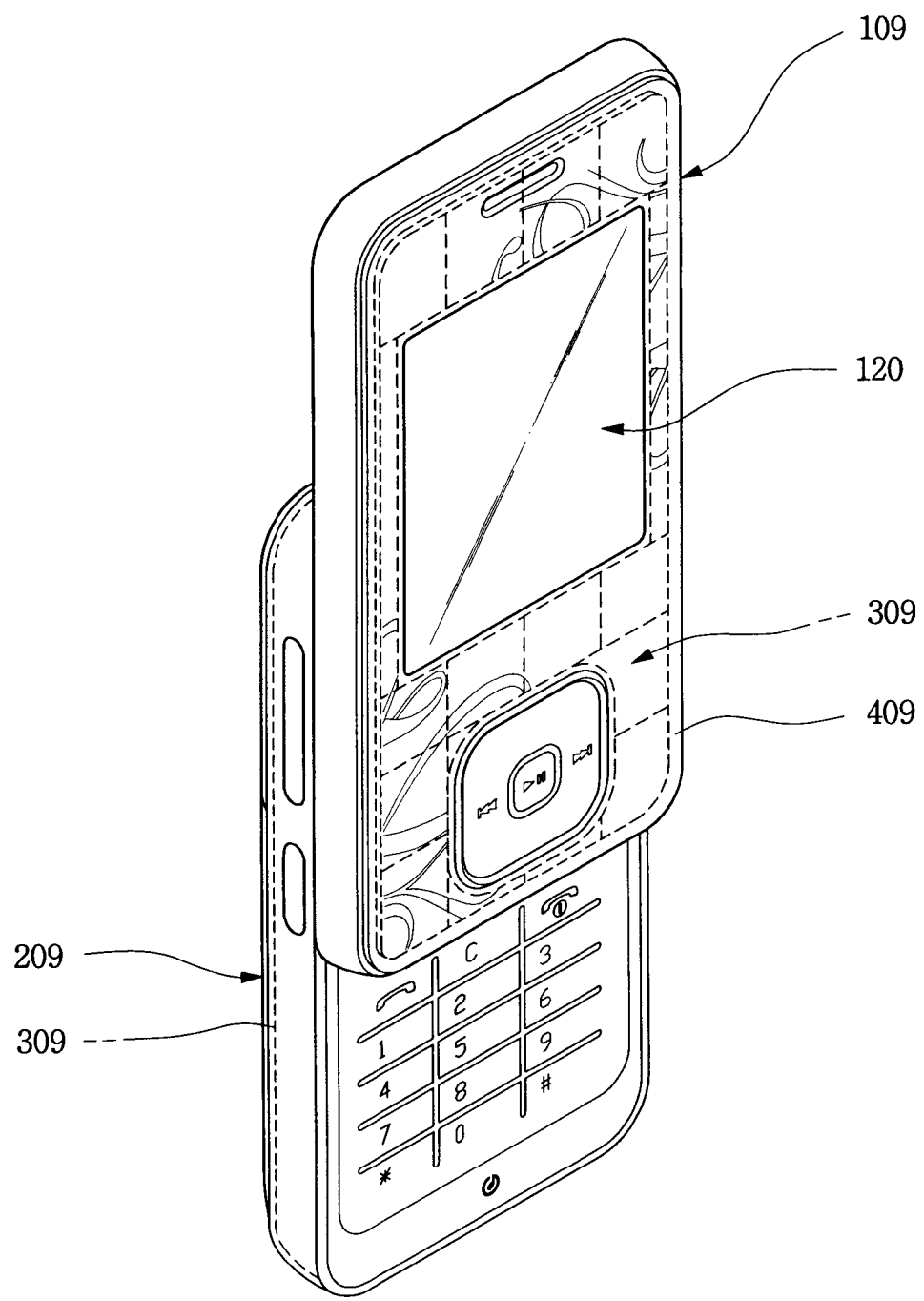
FIG. 2 is a perspective view illustrating a mobile communication terminal having an electronic paper display unit according to a second embodiment of the present invention.
Figure 3:
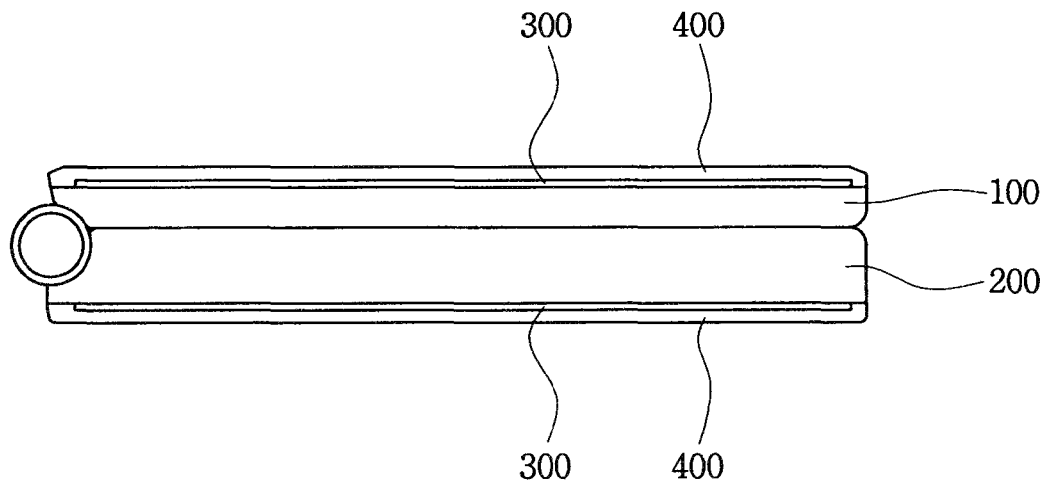
FIG. 3 is a side view illustrating the mobile communication terminal of FIG. 1.

The mobile communication terminal may be a folding type in which one end of the main body 100 can be hinged on the other end of the sub-body 200 as illustrated in FIG. 1, or a sliding type in which the main body 109 can be slid on the sub-body 209 as illustrated in FIG. 2.

Thus, the electronic paper display unit of the present invention can be applied to both the mobile communication terminal of FIG. 1 and the mobile communication terminal of FIG. 2.

Now, the configuration and operation of the electronic paper display unit of the present invention will be described as follows.

The electronic paper display unit of the present invention includes a protective case 400 or 409 coupled to a base member, a display 300 or 309 installed in the protective case 400, and a control module 500 controlling the display 300 to display desired image information.

The base member can be either the main body 100 or 109 or the sub-body 200 or 209 as illustrated in FIG. 1 or 2.

Figure 5:
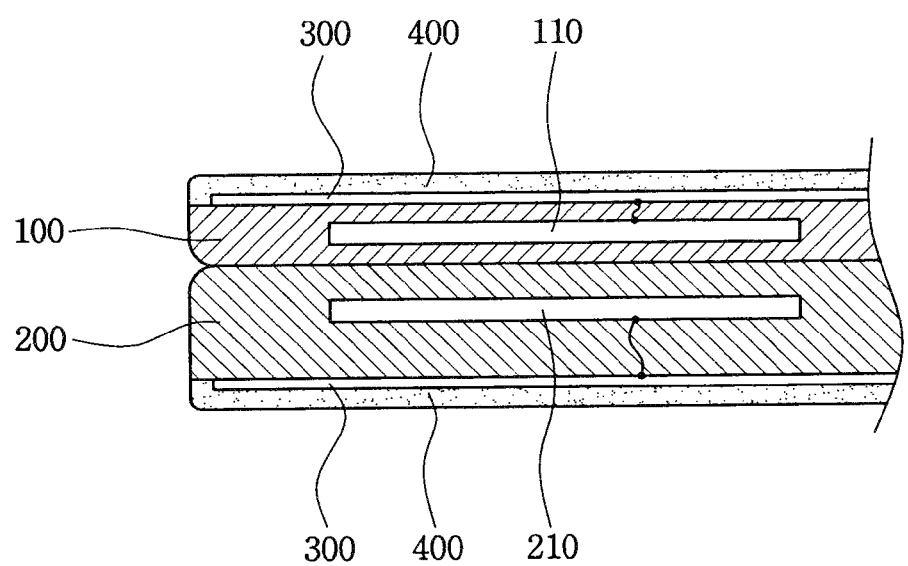
FIG. 5 is a partial sectional view taken along the line I-I' of FIG. 1.

More specifically, referring to FIG. 5, the protective case 400, made of a transparent material, is installed on the outside of the main body 100 and the sub-body 200 with a predetermined thickness.

The protective case 400 may be made of a transparent material (e.g. plastic) or an elastic material (e.g. rubber).

The protective case 400 is coupled with the main body 100 and the sub-body 200 using a coupling means.

Figure 6:
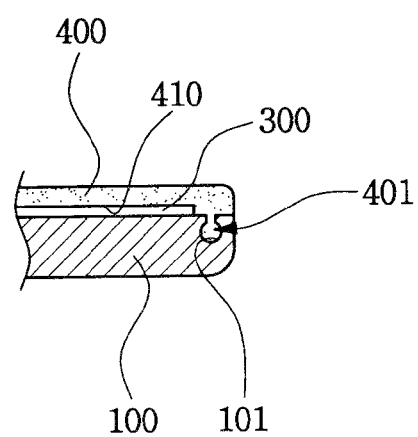
FIG. 6 is a partial sectional view taken along the line II-IF of FIG. 1.

As illustrated in FIG. 6, the coupling means includes sliding ridges 401, which projects outwards from the inner face of the protective case 400, and sliding holes 101, which are formed in the outer face of the main body 100 and will be coupled with the sliding ridges 401.

Further, although not illustrated in the drawings, the sliding ridges 401 may be formed on the outer face of the main body 100, and the sliding holes 101 may be formed in the inner face of the protective case 400.

Of course, the protective case 400 can be coupled with the main body 100 or the sub-body 200 by means of an adhesive material (not shown) such as glue or tape.

Here, the protective case 400 is provided with a recess 410 for installing the display 300 in the inner face thereof.

Figure 7:
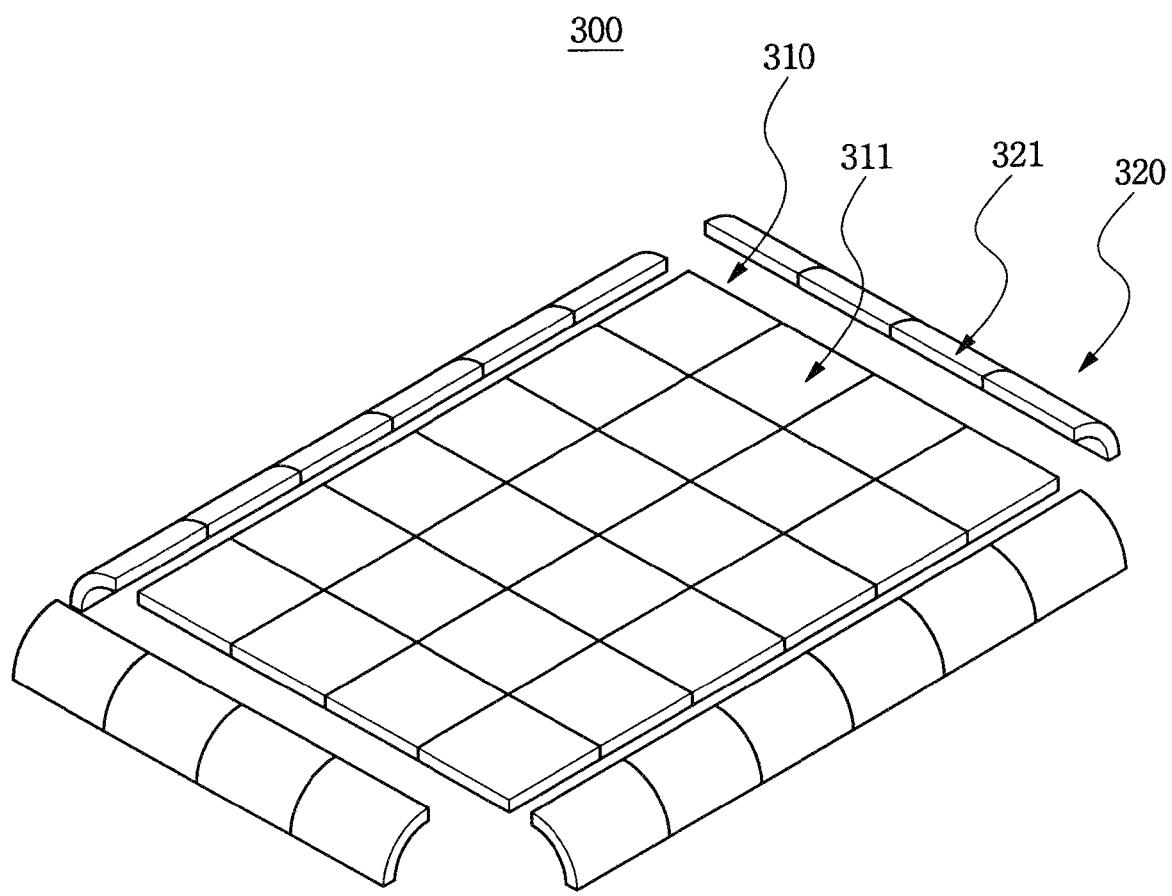
FIG. 7 is a perspective view illustrating a display according to an embodiment of the present invention.

Now, the display 300 of the present invention will be described with reference to FIG. 7.

The display 300, installed in the inner face of the protective case 400, is powered to display desired image information, and includes a main region 310, which includes a plurality of divided main regions 311.

Thus, each of the divided main regions 311 functions as an independent display to show the image information.

The main region 310 further includes sub-regions 320, which are disposed in a curved shape on the outer circumference of the main region 310.

Each sub-region 320 is coupled with the outer circumference of the main region 310. Each sub-region 320 is electrically connected and can be operated with the separate power.

Each sub-region 320 is powered to display the image information, a contrast of which is gradually increased from one end to the other end of each sub-region 320 along the outer circumferences.

The power may be supplied by the control module 500, which will be described below. The contrast can also be controlled by the control module 500.

In addition, each sub-region 320 includes a plurality of divided sub-regions 321.

Figure 8:
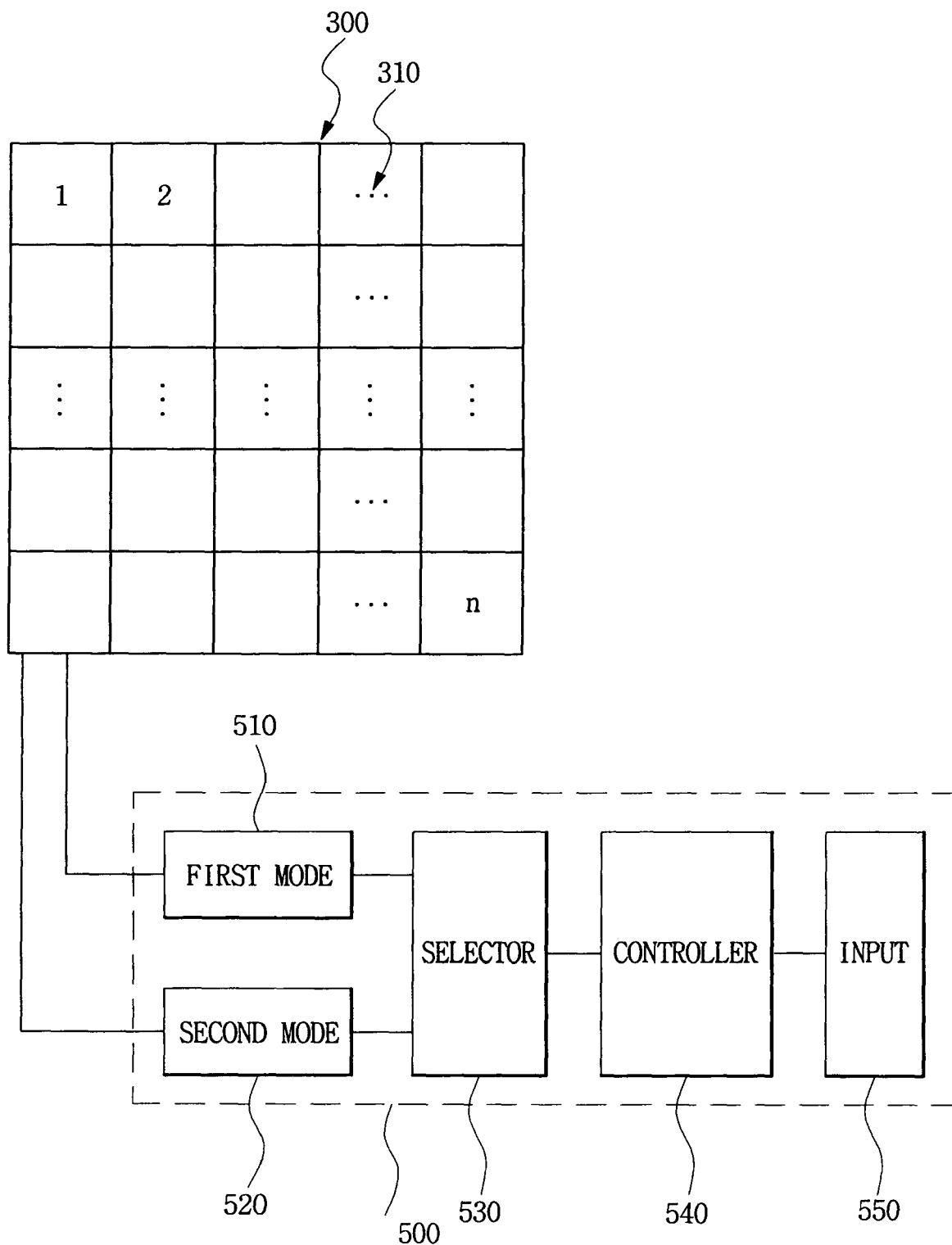
FIG. 8 is a block diagram illustrating the operation of an electronic paper display unit according to an embodiment of the present invention.

Next, the control module 500 of the present invention will be described with reference to FIG. 8.

The control module 500 is installed in the sub-body 200 to be connected electrically with the display 300, and includes a first mode 510, transmitting a divided mode signal such that many pieces of the first image information are independently displayed on the divided main regions 311, and a second mode 520, transmitting an integrated mode signal such that one piece of the second image information is displayed throughout the overall divided main regions 311.

In detail, the display 300 of the present invention includes both the main region 310 having the divided main regions 311, and the sub-regions 320 surrounding the main region 310.

The main region 310 is arranged in a grid shape, and includes n numbers of the divided main regions 311.

The n numbers of the divided main regions 311 are electrically connected with the control module 500.

Although not illustrated, each sub-region has the shape of a bar having a predetermined length, and includes m numbers of the divided sub-regions 321.

The m numbers of the divided sub-regions 321 are electrically connected with the control module 500.

Meanwhile, the first mode 510 outputs the divided mode signal such that many pieces of the first image information are independently displayed on each of the divided main regions 311 of the main region 310 and each of the divided sub-regions 321 of each sub-region 320.

The second mode 520 outputs the integrated mode signal such that one piece of the second image information is displayed throughout the overall divided main regions 311 of the main region 310 and the overall divided sub-regions 321 of each sub-region 320.

In addition, the control module 500 further includes an input 550, which can input the source information constituted of the first and second image information.

The input 550 can be adapted to select one or more of the many pieces of the source information such as moving pictures, photographs, or the color information, so that it can use the selected information as the first image information or the second image information.

When the source information for the first image information or the second image information is input through the input 550, the control module 500 secures a predetermined memory, and then stores the source information in the memory.

For example, when the source information for the first image information is input through the input 550, a controller 540 of the control module 500 stores the source information, and then transmits an electrical signal to the first mode 510.

Thus, the first mode 510 outputs the divided mode signal, so that the first image information can be displayed on each of the divided main regions 311.

Here, all pieces of the first image information, which are displayed on each of the divided main regions 311, may be equal to or different from each other.

If different, the different pieces of the first image information are input into the controller 540 through the input 550. The controller 540 stores the different pieces of the first image information, which will be transmitted to each of the divided main regions 311.

Meanwhile, the control module 500 further includes a selector 530, which can select at least one of the divided main regions 311 to control on/off operation of the selected region.

Thus, the first image information is allowed to be displayed only on the divided main region 311 indicated by the selector 530.

In contrast, when the source information for the second image information is input through the input 550, the controller 540 stores the source information, and then transmits an electrical signal to the second mode 520.

Thus, the second mode 520 outputs the integrated mode signal, so that the second image information can be displayed on the divided main regions 311.

Here, the divided main regions 311 function to display one piece of the second image information.

Although the present invention describes the sample case where the first or second image information is displayed on the divided main regions through the first or second mode 510 or 520 of the control module 500, this case is equally applied to the sub-regions 320.

Meanwhile, the sub-regions 320 are typically installed on the edges of the main body 100 or the sub-body 200 of the mobile communication terminal as illustrated in FIG. 1.

Each sub-region 320 is curved from one end to the other end thereof.

Thus, the contrast for the first or second image information displayed from one end to the other end of the sub-regions 320 thereof can be visually varied.

When the sub-regions 320 are visually tested at a predetermined position, the controller 540 can gradually increase the contrast from one end to the other end of each sub-region 320. Thus the displayed contrast can be adjusted equally.

In addition, one or more of the divided main regions 311 of the main region 310 may have the curved regions.

When the display 300 having the main region 310 is installed on the main body 100 or the sub-body 200 of the mobile communication terminal, it can be installed in accordance with the shapes of the edge of the main body 100 or the sub-body 200.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A portable communication device comprising:
a display cover forming at least part of a front surface of the portable communication device, the display cover including a planar surface and a curved surface configured to curve from the planar surface to a lateral edge of the display cover; and
a display located below the display cover, the display including a planar area and a curved area, the planar area visible through at least part of the planar surface of the display cover, and the curved area visible through at least part of the curved surface of the display cover,
wherein the display forms at least part of a display device including a light emitting diode and attached to the display cover as curved along with at least part of the curved surface of the display cover.

2. The portable communication device of claim 1, further comprising a plurality of circuit boards, wherein at least one circuit board of the plurality of circuit boards is electrically coupled with the display.

3. The portable communication device of claim 1, wherein the display includes another area visible via at least part of another curved surface located on an opposite side of the display cover from the curved surface.

4. The portable communication device of claim 3, wherein the other curved surface is located on an opposite side of the portable communication device from the curved area.

5. The portable communication device of claim 1, wherein the curved area is extended from the planar area as curved towards a rear surface of the portable communication device.

6. The portable communication device of claim 1, wherein at least part of the curved area is configured to display information.

7. The portable communication device of claim 6, wherein the curved area comprises a plurality of divided portions including a first divided portion and a second divided portion, the first divided portion configured to display at least part of the information independently of the second divided portion.

8. The portable communication device of claim 6, wherein the planar area is configured to be inactivated at least temporarily based at least in part on activation of the curved area.

9. The portable communication device of claim 1, further comprising a rear cover forming at least part of a rear surface of the portable communication device, the rear cover including another planar surface and another curved surface extended from the other planar surface.

10. A portable communication device comprising:
a display cover including a planar surface, a first curved surface and a second curved surface, the planar surface forming at least part of a front surface of the portable communication device, the first curved surface configured to curve from a first portion of the planar surface to a lateral side of the display cover and forming at least part of a first side surface of the portable communication device, and the second curved surface extended from a second portion of the planar surface opposite to the first portion and forming at least part of a second side surface of the portable communication device opposite to the first side surface; and
a display located below the display cover, the display including a planar area, a first curved area and a second curved area, the planar area visible via at least part of the planar surface of the display cover, the first curved area visible through at least part of the first curved surface of the display cover, and the second curved area visible through at least part of the second curved surface of the display cover,
wherein the display forms at least part of a display device including a light emitting diode and attached to the display cover as curved along with at least part of the curved surface of the display cover.

11. The portable communication device of claim 10, wherein the first curved area and the second curved area are configured to display information.

12. The portable communication device of claim 10, further comprising a circuit board located below the display, wherein the circuit board includes a controller operatively coupled with the display and configured to control the display such that each of the planar area, the first curved area and the second curved area is to display a different portion of same content.

13. The portable communication device of claim 10, wherein at least one of the first curved area or second curved area is extended from the planar area as curved towards a rear surface of the portable communication device.

14. The portable communication device of claim 10, wherein at least part of the first curved area is configured to display information independent of the second curved area.

15. The portable communication device of claim 14, wherein the first curved area comprises a plurality of divided portions including a first divided portion and a second divided portion, the first divided portion configured to display at least part of the information independently of the second divided portion.

16. The portable communication device of claim 14, wherein the planar area is configured to be inactivated at least temporarily based at least in part on activation of the first curved area.

17. The portable communication device of claim 10, further comprising a rear cover forming at least part of a rear surface of the portable communication device, the rear cover including another planar surface and another curved surface extended from the other planar surface.

18. The portable communication device of claim 10, wherein the planar area comprises a plurality of divided portions including a first planar divided portion and a second planar divided portion.

19. The portable communication device of claim 18, wherein the first planar divided portion is configured to display at least part of information independently of the second planar divided portion.

* * * * *